Feb. 19, 1924.
J. P. RUNCK
1,484,380
SNOWPLOW
Filed Aug. 31. 1922    2 Sheets-Sheet 1
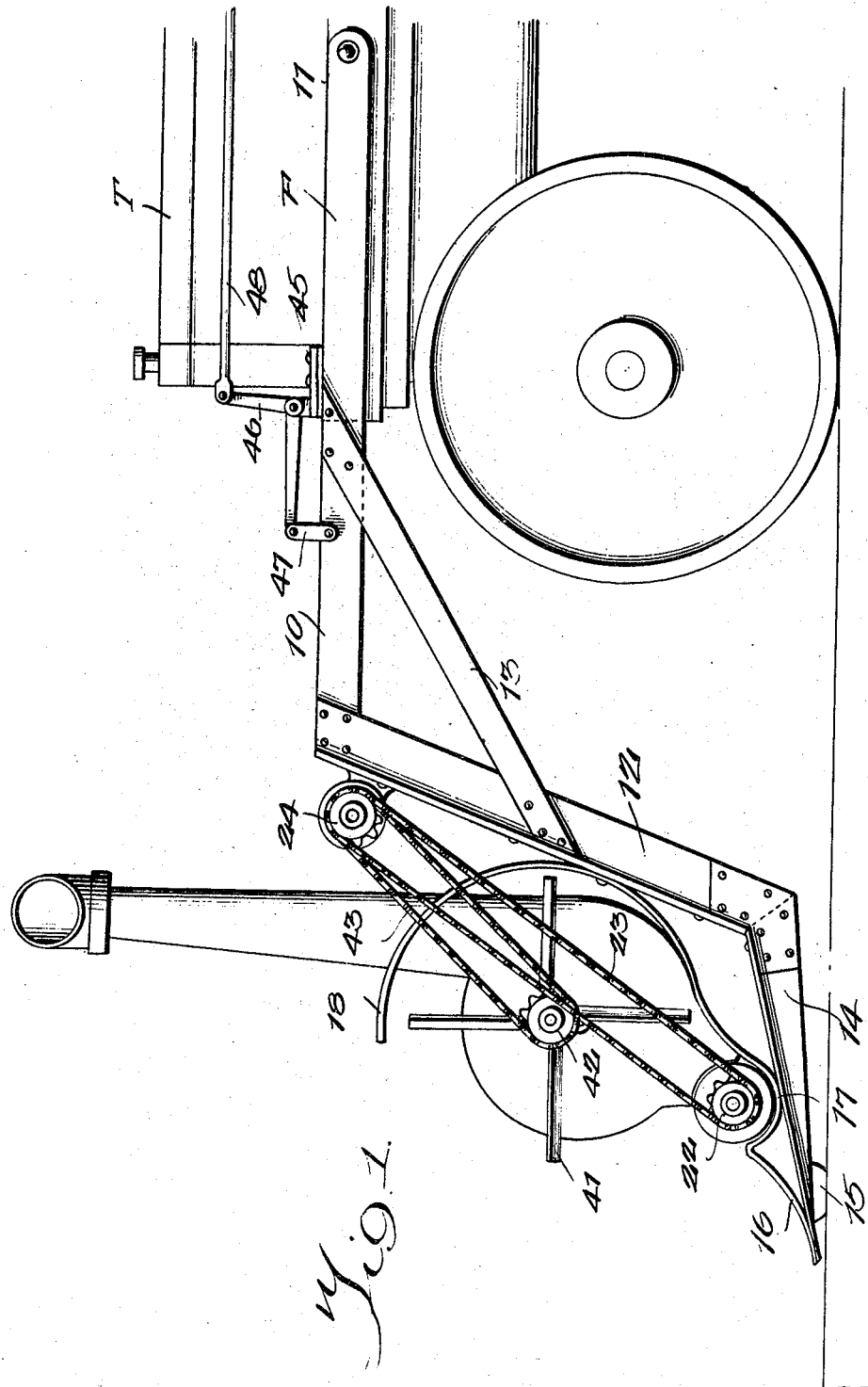
Inventor
J. P. Runck
By Richard B. Owen
Attorney
WITNESSES
J. S. O'Cattan
R. A. McLeod.

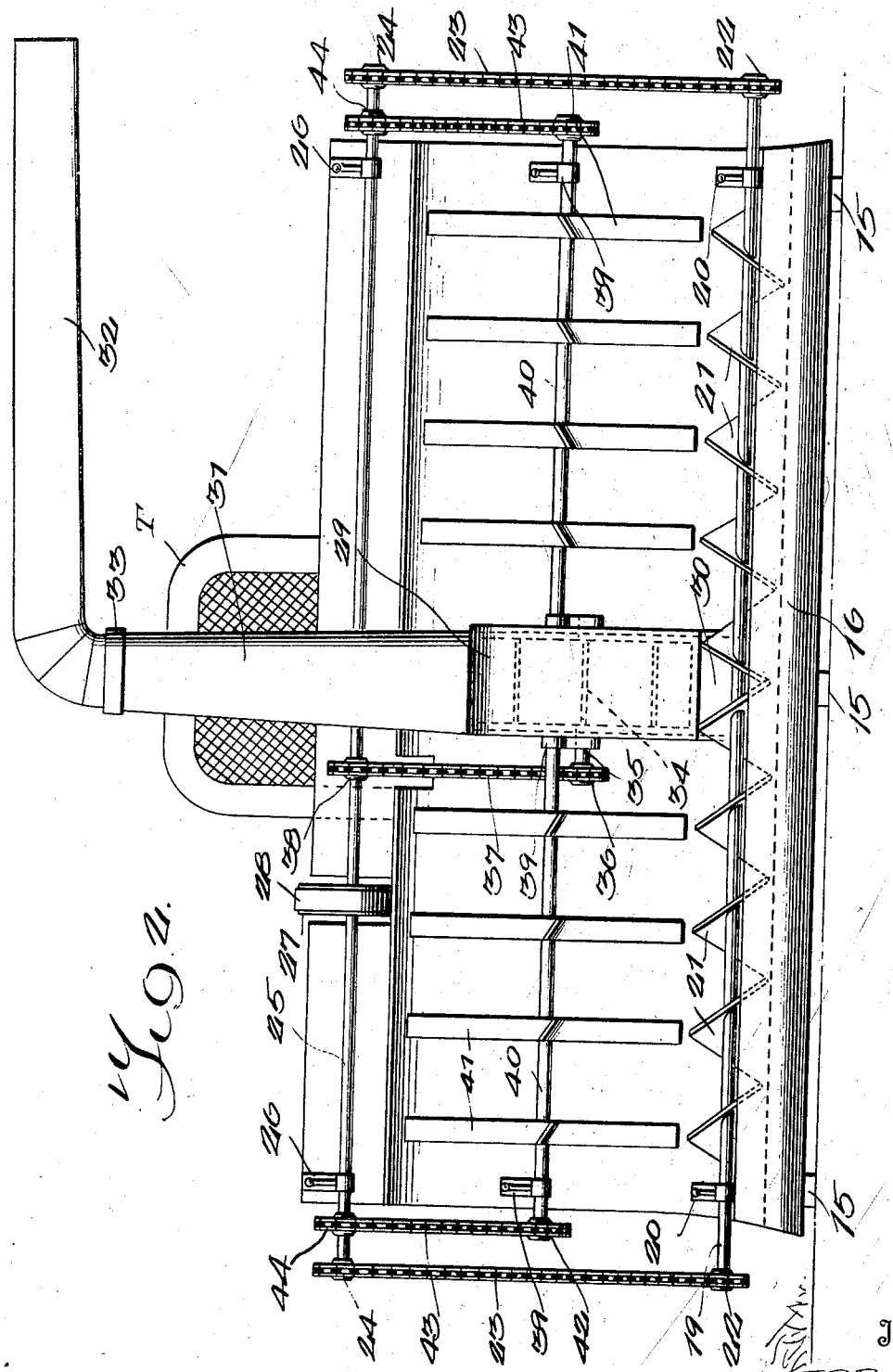

Patented Feb. 19, 1924.

1,484,380

UNITED STATES PATENT OFFICE.

JOHN P. RUNCK, OF CASSELTON, NORTH DAKOTA.

SNOWPLOW.

Application filed August 31, 1922. Serial No. 585,444.

*To all whom it may concern:*

Be it known that I, JOHN P. RUNCK, a citizen of the United States, residing at Casselton, in the county of Cass and State of North Dakota, have invented certain new and useful Improvements in Snowplows, of which the following is a specification.

This invention relates to snow plows and has special reference to a plowing device adapted for convenient connection to a tractor or the like.

One important object of the invention is to provide a simple and improved device of this character especially adapted for use on roads and highways in such localities as the northern part of the United States and in Canada.

A second important object of the invention is to improve the general construction of such devices.

A third important object of the invention is to provide an improved device of this character having a novel arrangement of conveyors and breakers of heavy snow drifts.

A fourth important object of the invention is to provide an improved device of this character having a novel arrangement of pneumatic means for disposing of the snow.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a side elevation of the device as applied to a tractor.

Figure 2 is a front view thereof.

In the embodiment of the invention herein illustrated there is provided a frame which includes a pair of spaced beams 10 which may be pivoted to the frame F of a tractor T as at 11. The rear ends of these beams 10 being thus pivoted, the forward ends extend well in front of the tractor and from these beams extends downwardly and forwardly a pair of beams 12 which are securely braced to the beams 10 by means of diagonals 13. The floor beams, or members 14, extend forwardly and at a slightly downwardly inclination from the beams 12, being supported above the road by spaced shoes 15. Secured to the beams 12 and 14 is a housing or shield and this shield starts from the forward ends of the beams 14 being curved upwardly as at 16 and then downwardly to provide a trough as at 17, the shield extending from the trough rearwardly to the beams 12 and then being curved forwardly as at 18. Extending centrally through the trough is a shaft 19 supported in bearings 20 mounted on the shield. This shaft carries a spiral conveyor 21 one of each of the conveyors being right handed and the other being left handed and the arrangement being such as to feed material toward the center. The shaft 19 has fixed at each end thereof sprockets 22 which are connected by chains 23 with sprockets 24 on a jack shaft 25 supported in bearings 26 at the upper part of the shield. On this jack shaft is a driving pulley 27 which is connected by a belt 28 with a suitable driving pulley (not shown) on the tractor T. In this manner motion is imparted to the shaft 19. Located centrally of the shaft 19 is a fan casing 29 having a central intake opening 30 and provided with an outlet pipe 31 having a lateral delivery pipe 32 swiveled thereto as at 33. In the casing 30 is the usual fan 34 which is mounted on a shaft 35 whereon is a sprocket 36 connected by a chain 37 with a sprocket 38 fixed on the shaft 25. Mounted in suitable bearings 39 are shafts 40 each of which carries a series of breaker blades or fans 41. These shafts 40 each carries a sprocket 42 which is connected by a chain 43 with a sprocket 44 on the shaft 25.

With the snow plow thus constructed it will be seen that the front part 16 of the shield digs into the snow and lifts it so that it may be acted upon by the conveyor 21. This conveyor forces the snow toward the inlet 30 and from this point, by the action of the fan 34, the snow is blown up through the pipe 31 and nozzle 32 and thrown laterally clear over the road. In the event that deep drifts are encountered or that the snow is packed hard and rises up above the conveyor 21 to an excessive distance the breaker blades 41 act on this hard packed snow and not only do they break up the mass but they also urge it toward the center of the device so that they assist the conveyor 21 in feeding as well as perform their function of breakers.

In order to regulate the height of the device there is mounted on the frame of the tractor a bracket 45 to which is pivoted the angle of a bell crank lever 46, one arm of which is connected to one of the beams 10 by a link 47 while to the other arm of the lever is connected a pull rod 48 which may be manipulated from the rear of the tractor by the usual latch lever and quadrant (not shown).

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention what is claimed as new, is:—

1. In a device of the kind described, a frame, a shield carried by said frame and having a trough shaped portion adjacent its forward edge, a blower fan located centrally above said trough shaped portion, a right and left hand conveyor mounted in the trough shaped portion and arranged to convey material toward the intake opening of the fan, a delivery pipe leading from said fan, means to drive the said conveyor and fan, and a lump breaking device mounted above said conveyor and to the rear thereof.

2. In a device of the kind described, a frame, a shield carried by said frame and having a trough shaped portion adjacent its forward edge, a blower fan located centrally above said trough shaped portion, a right and left hand conveyor mounted in the trough shaped portion and arranged to convey material toward the intake opening of the fan, a delivery pipe leading from said fan, means to drive said conveyor and fan, and a combined lump breaking and conveying device mounted above the said conveyor and to the rear thereof.

3. In a device of the kind described, a frame, a shield carried by said frame and having a trough shaped portion adjacent its forward edge, a blower fan located centrally above said trough shaped portion and having an intake opening at said trough shaped portion, a right and left hand conveyor mounted in the trough shaped portion and arranged to convey material toward the intake opening of the fan, a shaft at each side of said fan extending parallel to the conveyor and blades radiating from said shafts and inclined to direct material towards said fan, and means to drive said conveyor, fan and shafts.

In testimony whereof he affixes his signature in presence of two witnesses.

JOHN P. RUNCK.

Witnesses:
J. F. CALLAHAN,
M. S. KNIGHT.